US009633450B2

(12) United States Patent
Arita (10) Patent No.: US 9,633,450 B2
(45) Date of Patent: Apr. 25, 2017

(54) IMAGE MEASUREMENT DEVICE, AND RECORDING MEDIUM (71) Applicant: Sharp Kabushiki Kaisha, Osaka-shi, Osaka (JP)

(72) Inventor: Shinichi Arita, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 8 days.

(21) Appl. No.: 14/442,161

(22) PCT Filed: Nov. 26, 2013

(86) PCT No.: PCT/JP2013/081690
§ 371 (c)(1),
(2) Date: May 12, 2015

(87) PCT Pub. No.: WO2014/084181
PCT Pub. Date: Jun. 5, 2014

(65) Prior Publication Data
US 2016/0292888 A1 Oct. 6, 2016

(30) Foreign Application Priority Data

Nov. 30, 2012 (JP) .................................. 2012-263024

(51) Int. Cl.
| G06K 9/00 | (2006.01) |
| G06T 7/60 | (2017.01) |
| G01B 11/02 | (2006.01) |
| G01B 11/24 | (2006.01) |
| G01B 11/00 | (2006.01) |
| H04N 13/00 | (2006.01) |
| H04N 13/02 | (2006.01) |

(Continued)

(52) U.S. Cl.
CPC .............. *G06T 7/60* (2013.01); *G01B 11/002* (2013.01); *G01B 11/02* (2013.01); *G01B 11/24* (2013.01); *G06T 7/74* (2017.01); *H04N 13/0007* (2013.01); *H04N 13/0239* (2013.01); *G06T 2207/10012* (2013.01); *H04N 2013/0081* (2013.01)

(58) Field of Classification Search
CPC .............. G06T 7/00; H04N 13/00; G06K 9/00
USPC ........ 382/106, 109, 206, 255, 286; 348/135, 348/180
See application file for complete search history.

(56) References Cited

U.S. PATENT DOCUMENTS

| 6,389,153 B1 * | 5/2002 | Imai ...................... G06T 15/503 |
| | | 348/E13.014 |
| 2009/0041337 A1 * | 2/2009 | Nakano .............. G06K 9/00798 |
| | | 382/154 |
| 2011/0249117 A1 | 10/2011 | Yoshihama et al. |

FOREIGN PATENT DOCUMENTS

| JP | 9-81755 A | 3/1997 |
| JP | 2011-232330 A | 11/2011 |

* cited by examiner

*Primary Examiner* — Abolfazl Tabatabai
(74) *Attorney, Agent, or Firm* — Keating & Bennett, LLP (57) ABSTRACT

An image measurement device calculates a disparity value from image data of images having disparity, acquires three-dimensional position information at the time of capturing the image data by using the disparity value, and calculates a three-dimensional plane from a region on an image serving as a same plane as a designated measurement region. Three-dimensional positions of the measurement region are acquired from the calculated three-dimensional plane to calculate a length. Accordingly, by using captured images (Continued)

having disparity, it is possible to measure a length of any part even in a region that the disparity value is hard to be acquired.

4 Claims, 6 Drawing Sheets

(51) Int. Cl.
*G06T 7/73* (2017.01)
*H04N 7/18* (2006.01)

WALL SURFACE(1) 302
WALL SURFACE(2) 303
FLOOR SURFACE 301

| M1 | | | | M2 | | |
|---|---|---|---|---|---|---|
| X1 | X2 | X3 | | X'1 | X'2 | X'3 |
| X4 | X5 | X6 | ------- | X'1 | X'2 | X'3 |
| X7 | X8 | X9 | | X'1 | X'2 | X'3 |

IMAGE MEASUREMENT DEVICE, AND RECORDING MEDIUM

TECHNICAL FIELD

The present invention relates to an image measurement device, an image measurement method, and a program capable of measuring a length of any part by using an image capturing apparatus having binocular disparity even in a region in which a feature is difficult to be acquired.

BACKGROUND ART

In daily life, there is a situation where a length such as a width or height of a space in which an object is placed is desired to be known. To deal with this, in the present circumstances, for example, a measure is used to measure the length in many cases, but for reasons that operation is troublesome, it is difficult to measure a length out of reach, and the like, it is requested to enable measurement easily in a non-contact manner. Further, a system is desired that allows, at the time of measurement, whether an intended portion of an object is being able to be measured to be visually identified easily. Thus, a technique has been proposed in which images that are captured from different viewpoints are used to acquire three-dimensional information such as a distance to an object or a length of the object from disparity information which indicates a shift between the viewpoints.

PTL 1 discloses a technique that by using an image capturing apparatus including two imaging units, a three-dimensional model of an object is generated from pair images having binocular disparity and a length between two points designated by a user is calculated, and it is possible to measure an actual length between the designated two points on the image.

Further, PTL 2 discloses a technique that, in the same manner as PTL 1, by using an image capturing apparatus including two imaging units, distance information is acquired from pair images having binocular disparity. In PTL 2, further, distance data which is measured partially on an observation plane is subjected to Hough transform, a plane is estimated by applying two or more straight lines within the observation plane, and distance information in the plane is acquired, thus making it possible to acquire undetermined distance data in the plane.

CITATION LIST

Patent Literatures

PTL 1: Japanese Unexamined Patent Application Publication No. 2011-232330
PTL 2: Japanese Unexamined Patent Application Publication No. 9-81755

SUMMARY OF INVENTION

Technical Problem

In the technique described in PTL 1 above, however, since it is necessary to generate the three-dimensional model of the object, it is necessary to calculate three-dimensional positions across a lot of points on the object, thus posing a problem that a processing amount increases and a size of a system also increases. Further, there is a problem that it is not always possible to acquire three-dimensional position information of two points which are desired to be measured in the three-dimensional model generated from captured image data. This is because there is a case where a point corresponding to the point which is desired to be measured is not able to be detected when the measurement point is in a featureless region or a similar pattern such as a repetitive pattern, etc.

In order to measure a length more easily and reliably, it is necessary to reduce the processing amount and measure the length between desired two points reliably from a captured image, but there is no description in consideration of these in PTL 1.

Moreover, in PTL 2, an image is divided into a plurality of blocks, distance data is acquired for each block, and a straight line through a plane is calculated based on the distance data from a block group which is grouped in a horizontal direction, and the plane is estimated by a plurality of straight lines through the plane which are acquired in the same manner. At this time, straight lines on the plane are estimated based on the distance data of each block, but when a featureless region is over a wide area, etc., the distance data is not able to be acquired in many blocks, so that there is a case where the accurate straight lines through the plane are not able to be acquired, resulting that the distance data of a target part is not able to be acquired. Further, normally, there exist a plurality of planes in a captured image, for example, such that a wall and a floor appear in the same image, in many cases, but a case where two or more planes exist is not assumed. Therefore, there is a case where a distance or a length of a target part is not able to be acquired. Furthermore, since distance calculation is performed by dividing the entire image into a plurality of blocks, the processing amount increases for calculation of disparity and approximation of straight lines, thus posing a problem that the processing amount increases exponentially when an image with high resolution is used.

The present invention has been made in view of circumstances described above, and aims to provide a length measuring technique that even in the case of a captured image in which a plurality of planes exist, by allowing acquisition of three-dimensional plane information which includes a measurement target part by simple operation, desired distance and size information is able to be acquired even for a part in which disparity is difficult to be calculated.

Solution to Problem

According to one viewpoint of the present invention, provided is an image measurement device including: a disparity value calculation unit that calculates a disparity value from image data of images having disparity; a three-dimensional position coordinate calculation unit that acquires three-dimensional position information of the image data by using the disparity value; a measurement region detection unit that detects a measurement region in the images having the disparity; a plane region acquisition unit that acquires a region which is positioned at a same plane with the measurement region by being designated in the image; a three-dimensional plane calculation unit that converts the region acquired by the plane region acquisition unit into a plane in a three-dimensional space; a measurement coordinate conversion unit that converts the measurement region into a position on the plane in the three-dimensional space; and a size information calculation unit that calculates a length of the measurement region.

According to the present invention, an effect is achieved that at the time of measuring a distance to a certain point or a length between two points on an object, even when a corresponding point is difficult to be acquired, for example, when a measurement part is a featureless part or has a similar pattern, the length between any two points is able to be measured.

The three-dimensional plane calculation unit performs detection of a feature point in the region of the plane in the three-dimensional space, outputs information of a feature region having a feature to the disparity value calculation unit, judges whether calculation of a disparity value is possible from the acquired feature region, selects three or more points in which a disparity value is calculated accurately to set as plane coordinates, and defines a three-dimensional plane position from the acquired plane coordinates of the three or more points.

By defining a plane region in which three or more points are included in the acquired feature region, it is possible to perform measurement of the length easily.

In the case of selecting the feature point, a combination in which three points of candidate points which are judged that calculation of the disparity value is possible are not arranged on a same straight line, which is a combination of the candidate points such that a line segment AB connecting measurement points A and B is included as much as possible in a region formed by the three points of the candidate points, is selected.

This is because errors are able to be reduced when the region formed by the three points is a sufficiently large region with respect to a size of the line segment. For example, when errors of the disparity values of the respective candidate points are at same degree, a three-dimensional plane passing the three points and a three-dimensional plane passing different three points respectively have inclinations fluctuated only by an amount of the errors of the respective points. At this time, when a distance L1 from an end point of the region formed by the former three points to the measurement point B and a distance L2 from an end point of the region formed by the latter three points to the measurement point B are compared, the L1 is larger and the measurement point B is positioned out of the region formed by the three points of the candidate points, so that by an amount according to a ratio thereof, the error on the measurement point B becomes great. Therefore, it is possible to reduce the error by selecting the combination of the candidate points including the line segment AB.

Moreover, the present invention may be a program for causing a computer to function as a disparity value calculation unit that calculates a disparity value from image data of images having disparity; a three-dimensional position coordinate calculation unit that acquires three-dimensional position information of the image data by using the disparity value; a measurement region detection unit that detects a measurement region in the images having the disparity; a plane region acquisition unit that acquires a region which is positioned at a same plane with the measurement region by being designated in the image; a three-dimensional plane calculation unit that converts the region acquired by the plane region acquisition unit into a plane in a three-dimensional space; a measurement coordinate conversion unit that converts the measurement region into a position on the plane in the three-dimensional space; and a size information calculation unit that calculates a length of the measurement region, or may be a computer readable recording medium having the program recorded therein.

The present description includes the content in its entirety described in the description and/or the drawings of Japanese Patent Application No. 2012-263024 which is the base of the priority of this application.

Advantageous Effects of Invention

According to the present invention, an effect is achieved that at the time of measuring a distance to a certain point or a length between two points on an object, even when a corresponding point is difficult to be acquired, for example, when a measurement part is a featureless part or has a similar pattern, the length between any two points is able to be measured.

DESCRIPTION OF EMBODIMENTS

Description will hereinafter be given for an image measuring technique according to the present invention by providing each embodiment with reference to drawings.

Figure 1A:
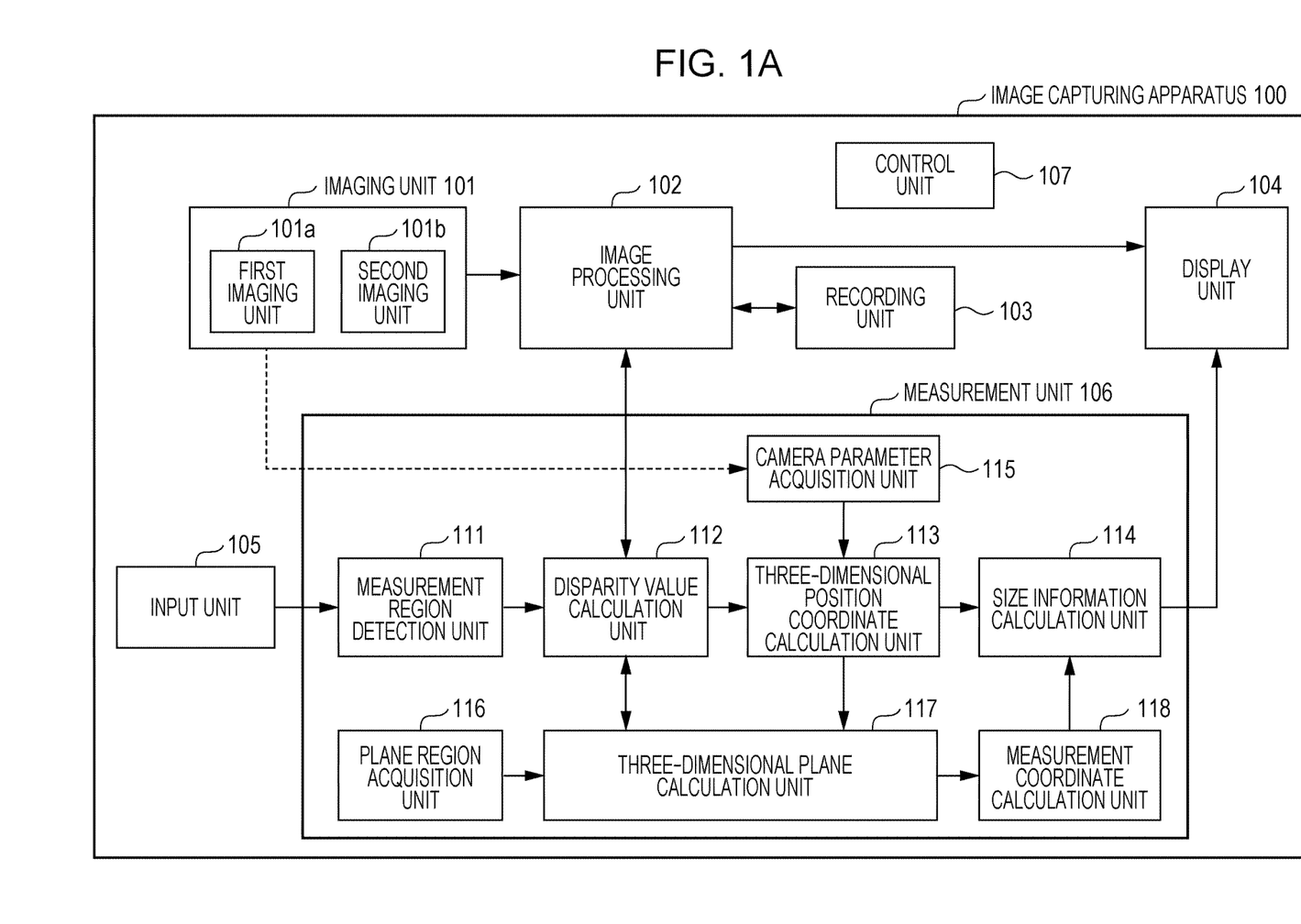
FIG. 1A is a functional block diagram illustrating a configuration example of an image capturing apparatus according to an embodiment of the present invention.

FIG. 1A is a functional block diagram illustrating a schematic configuration example of an image capturing apparatus having an image measuring (length measuring) function in an embodiment of the present invention. An image capturing apparatus 100 in the present embodiment has an imaging unit 101, an image processing unit 102, a recording unit 103, a display unit 104, an input unit 105, a measurement unit 106, and a control unit 107. However, all the configurations are not necessarily included.

The imaging unit 101 has at least two imaging units of a first imaging unit 101a and a second imaging 101b, and each of the imaging units 101a and 101b has a typical configuration of an image capturing apparatus configured by a lens, an imaging device such as a CCD (Charge Coupled Device) or a CMOS (Complementary Metal Oxide Semiconductor), a control unit which controls operation thereof, a memory and the like. The two imaging units 101a and 101b are arranged, for example, at positions mutually shifted in parallel to a right-left direction, and two images captured by the respective imaging units 101a and 101b have disparity.

For example, a certain point on a certain object is positioned at a place shifted in a horizontal direction on each of the two images because of their different capturing positions, that is, viewpoint positions, and a shift amount thereof is referred to as disparity. In this case, as to the disparity of the images which are captured in parallel arrangement, the disparity increases as the object is close to the image capturing apparatus and on the contrary the disparity decreases as being far, so that the disparity is almost 0 when the object is so far compared to a length between the imaging units, that is, in an infinity region. The disparity at a certain distance is determined by parameters related to an imaging device such as a baseline length which is a distance between the imaging units, an optical system, and resolution. In the present embodiment, description will be given by considering that the two imaging units 101a and 101b have equivalent properties (specifications) and use a same lens, imaging device and the like. When the specifications are different, with respect to the imaging unit serving as a reference, each parameter of the other imaging unit may be normalized. In this manner, captured image data which is data of an image captured by the imaging unit 101 is output to the image processing unit 102. Further, at this time, necessary capturing information such as a baseline length and focal distance information at the time of capturing images is output to a camera parameter acquisition unit 115. Note that, the camera parameter acquisition unit 115 may have a configuration of holding camera parameters in advance separately and does not receive necessary capturing information directly from the imaging unit 101.

Note that, hereinafter, images having disparity captured by the imaging unit 101, which are acquired in single capturing, are represented as images a and b. The image a and the image b are images acquired by the imaging unit 101a and the imaging unit 101b, respectively.

The image processing unit 102 performs processing of adjusting brightness or adjusting a color of image data captured by the imaging unit 101, conversion into a data format in accordance with the display unit 104, processing of outputting and reading data to and from the recording unit 103, and the like. Moreover, processing such as outputting image data to the measurement unit 106 described below, superimposing information such as a character, a mark or a graphic on the captured images for outputting based on information acquired from the measurement unit 106, and the like are performed. In the present embodiment, it is considered that a disparity value of the captured image data from the imaging unit 101 is not adjusted, but, for example, when the image data is output after adjusting the disparity value of the images a and b in order to adjust stereoscopic effect of a stereoscopic video, the image processing unit 102 outputs the image data to the measurement unit 106 by performing processing so as to return to an original arrangement state.

The recording unit 103 is configured by a hard disk, a flash memory, or the like, and performs recording of the image data output from the image processing unit 102. For example, in the present embodiment, since a length is measured by capturing a plurality of still images, images which are captured in the measurement, that is, the images a and b which are captured by the respective imaging units are recorded in association with each other.

The display unit 104 is a device that displays an image received from the image processing unit 102, or the like, and is configured by, for example, a liquid crystal display. The display unit 104 may be integrally configured with the input unit 105 described below like a touch panel liquid crystal.

The input unit 105 is provided for inputting a command of selection or determination by a user, and for inputting, for example, by a cross-key for moving a pointer on an image or a touch panel. In the present embodiment, the input unit 105 is configured by the touch panel liquid crystal which is integrated with the display unit 104, and when a measurement point on an image is selected, it is possible to select a portion which is desired to be measured or the like by touching a part which is desired to be designated.

The measurement unit 106 is configured by a measurement region detection unit 111, a disparity value calculation unit 112, a three-dimensional position coordinate calculation unit 113, a size information calculation unit 114, the camera parameter acquisition unit 115, a plane region acquisition unit 116, a three-dimensional plane calculation unit 117, and a measurement coordinate calculation unit 118, and calculates a distance to a part which is desired to be measured by a user, a length between two points, and an area of a region from captured image data.

Figure 1B:
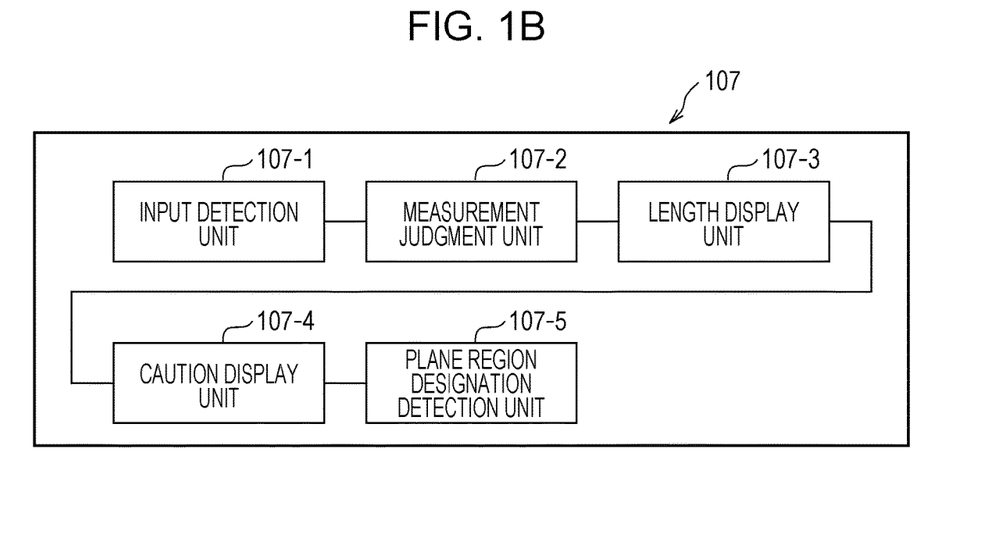
FIG. 1B is a functional block diagram illustrating a configuration example of a control unit of the image capturing apparatus according to the embodiment of the present invention.

The control unit 107 controls the entire apparatus. FIG. 1B is a functional block diagram illustrating a configuration example of the control unit 107. As illustrated in FIG. 1B, the control unit 107 has an input detection unit 107-1, a measurement judgment unit 107-2, a length display unit 107-3, a caution display unit 107-4, and a plane region designation detection unit 107-5.

Figure 2A:
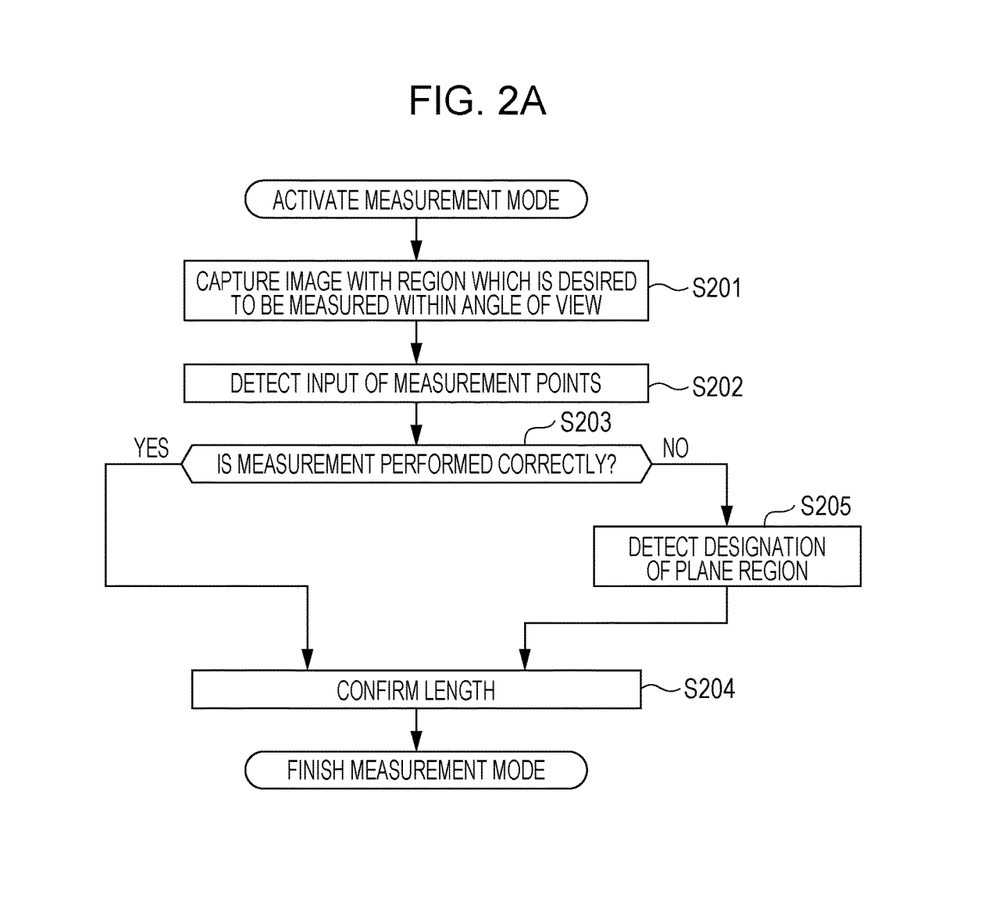
FIG. 2A is a diagram illustrating a measuring method from capturing images to confirmation of a measurement result when a region which is desired to be measured is measured by using the image capturing apparatus of the present embodiment.
Figure 2B:
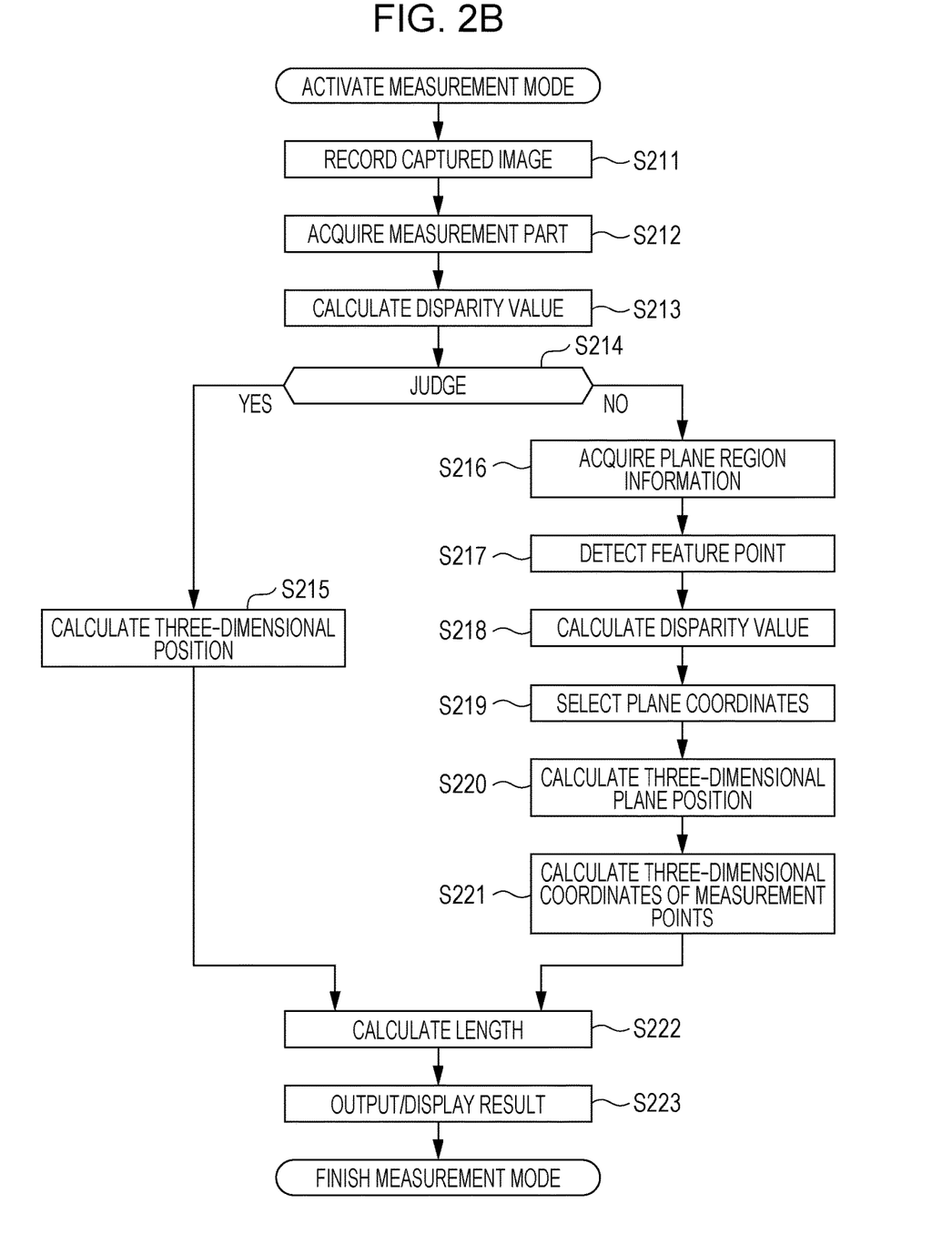
FIG. 2B is a flowchart which illustrates a flow of processing which is executed in each configuration unit of the image capturing apparatus of the present embodiment in measurement operation in FIG. 2A, and illustrates a summary of processing from acquisition of a captured image to calculation of a measurement region.

Here, description will be given in detail for each action while explaining an entire flow of measurement in the present embodiment. FIG. 2A illustrates an operation method in measurement, and is a flowchart illustrating a flow from capturing a region which is desired to be measured by a user to confirmation of a measurement result. Further, FIG. 2B is a flowchart illustrating a flow of processing at the time of measurement, which illustrates a flow of processing which is executed in each configuration unit of the image capturing apparatus 100 of the present embodiment in measurement processing, and represents a summary of processing from acquisition of captured images to calculation of a distance, a length, and an area of a measurement region.

Figure 3:
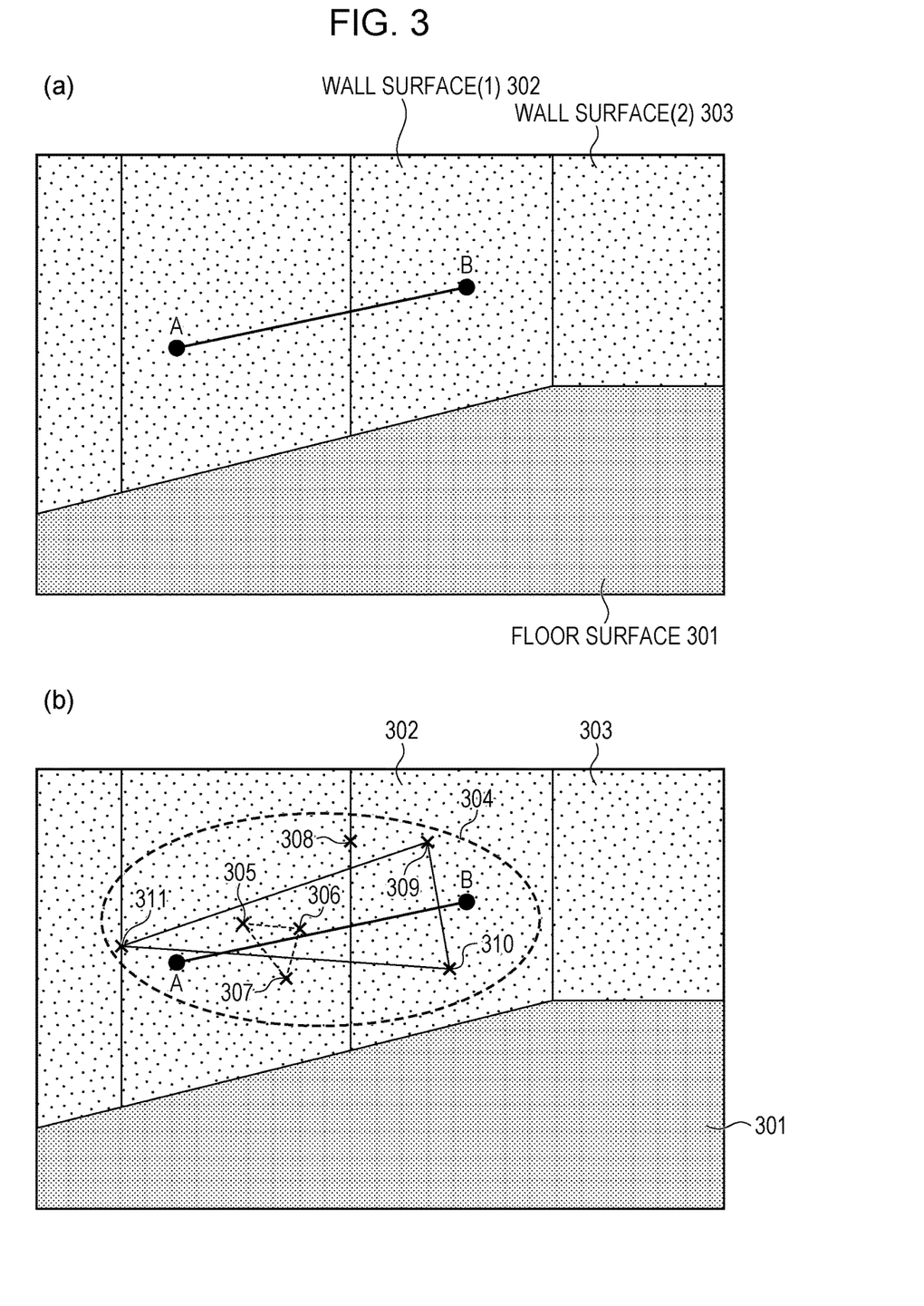
FIG. 3(a) is a view illustrating a captured image at the time of measurement.
FIG. 3(b) is a view illustrating a positional relation between a user and an object, and an example of a captured image.

First, description will be given regarding measurement procedure by using FIG. 2A. When the input detection unit 107-1 detects activation of a measurement mode, an image is captured by the image capturing device 100 so that a region as a measurement target falls within an angle of view of the image capturing apparatus (S201). An example of the image which is obtained by capturing an image of the measurement target at this time is illustrated in FIG. 3. In FIG. 3, the image is configured by a floor surface 301, a wall surface(1) 302, and a wall surface(2) 303 which is arranged at an angle different from that of the wall surface 302.

Here, description will be given by assuming a case where a length between two points A and B on the wall surface 302 is regarded as a measurement target. A captured image is displayed on a screen of the display unit 104 and input of the points A and B to be measured is detected on the screen (S202). After detection of the input of the measurement points, whether the measurement has been performed correctly is judged by the measurement judgment unit 107-2 (S203), and when a measurement result has no problem, a length between the desired points A and B is displayed on the screen by the length display unit 107-3 (S204). The judgment of the measurement result will be described in detail below. When the measurement result has a problem, a caution such as "designate a plane region" is displayed by the caution display unit 107-4, and the plane region designation detection unit 107-5 detects designation, by a user X, of a plane region in which the points A and B exist (S205). The length between the designated points A and B is calculated from plane region information which is designated, and the length is displayed by being superimposed on the screen. When the measurement result is confirmed with the superimposing display (S204), the measurement mode is finished.

Next, description will be given for a flow of processing of each configuration unit by using FIG. 2B along the aforementioned operation procedure. The measurement mode is activated, an image of a measurement target is captured, and captured images are recorded (S211). At this time, the images a and b having disparity which are acquired at the imaging unit 101 are passed to the image processing unit 102, subjected to brightness adjustment and conversion into various data formats such as JPEG, and recorded in the recording unit 103. Further, the captured image is displayed on the display unit 104. Here, the image captured by the imaging unit 101a arranged on a left side serves as a reference image, and this reference image is displayed on the display unit 104. The user X then designates by the input unit 105 a part which is desired to be measured from the displayed image, and acquires coordinates of the measurement part (S212). In the present embodiment, as described above, the display unit 104 is configured by the touch panel liquid crystal of an electrostatic capacitance type and is configured integrally with the input unit 105, but it is not limited to the aforementioned method as long as a method is for selecting a region which is desired to be measured while viewing an image, for example, selecting the region with a key for moving a cursor displayed on the image.

Next, the measurement region detection unit 111 detects the part designated by the input unit 105 and acquires coordinate data on the corresponding image. At this time, for example, a coordinate position of one point which is designated in the case of a distance, coordinate positions of two points which are designated in the case of a length, or coordinate positions of three or more points which are designated in the case of an area are acquired in association with a measurement point according to measurement desired by the user X. For example, in the case of the length, the display unit 104 is caused to output display for leading the user, such as "select two points", to acquire coordinate information of the two points which are input. The acquired coordinate information on the image is output to the disparity value calculation unit 112.

The disparity value calculation unit 112 acquires, on the image b of the imaging unit 101b, corresponding points in coordinates of input measurement parts A and B on the reference image a so as to calculate a disparity value. Each corresponding point indicates a same feature point on an object which appears in the images a and b, and in this case, since the images a and b are images captured by the imaging units arranged at different positions, the aforementioned same feature points are arranged at different coordinate positions on the two images. For example, when the two imaging units are arranged in the horizontal direction, the corresponding points are detected at the positions shifted in the horizontal direction.

A summary regarding the calculation of the disparity value in the present processing will be described. In the present embodiment, for example, a block matching method is usable for the calculation of the disparity value. In the calculation of the disparity value by the block matching method, feature point positions of a same object are detected in two images based on similarity in a unit of a block, and a shift amount therebetween (disparity amount) is detected. A common point in the two images according to the feature point is called the corresponding point as described above. For searching for the corresponding point, an SAD (Sum of Absolute Difference) is used as an evaluation function. In the SAD, windows are each set around a pixel of interest in an image 1 and an image 2, a difference of luminance of pixels between the set windows is acquired, and a sum of differences of luminance acquired between the respective pixels is calculated. Same processing is performed while changing the pixel of interest in the image 2 and the pixel of interest having a minimum value is determined as the corresponding point.

Figure 4:
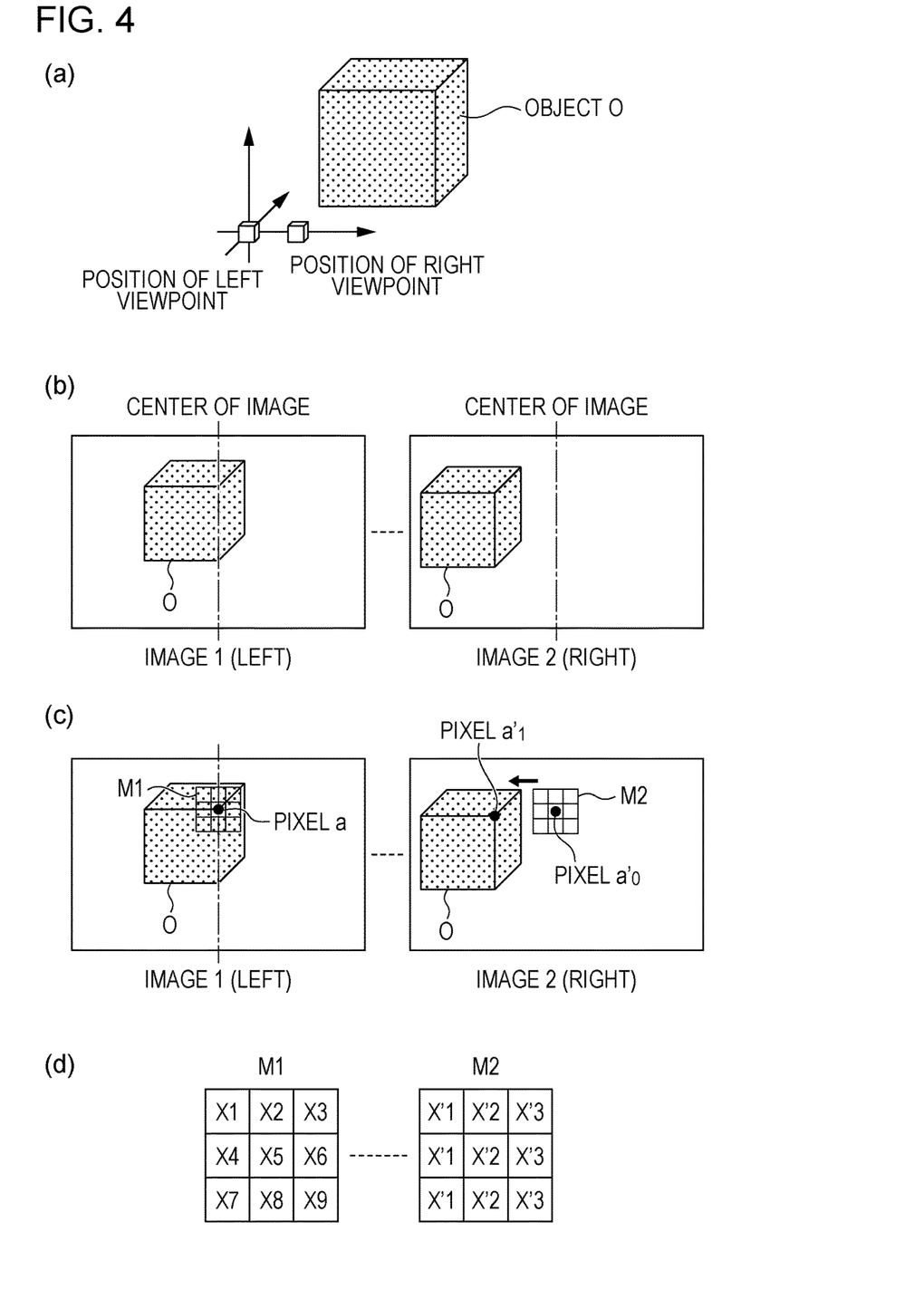
FIG. 4 includes schematic views when capturing images from different positions and a schematic view explaining block matching.

Here, description will be given specifically for content of the processing described above. FIG. 4(*a*) illustrates a schematic view when an image of an object O is captured from positions with different viewpoints in the horizontal direction. An image captured from a left viewpoint is the image 1 and an image captured from a right viewpoint is the image 2. The images captured at this time are illustrated in FIG. 4(*b*). It is found from FIG. 4(*b*) that because of different viewpoint positions, the object O is positioned at different positions in the respective images.

Description will be given using FIGS. 4(*c*) and 4(*d*) for block matching when one apex on the object O serves as a feature point in the case of calculating a disparity value with the image 1 as a reference. When this feature point exists in a pixel a on the image 1, a window M1 having a size of 3×3 with the pixel a as a center is set. Then, a pixel a'$_1$ which is at the same position as the pixel a in the image 2 is set as a search start point, and a window M2 of 3×3 is set. Next, a difference of luminance between the respective pixels in the windows which are set is acquired, and a sum of differences of luminance acquired between the respective pixels is calculated. For example, as illustrated in FIG. 4(*d*), values of pixels in the respective windows which are set are X1 to X9 and X'1 to X'9,

[Expression 1]

$$SAD = \sum_{i=0}^{3 \times 3 - 1} (|x_i - x'_i|) \qquad \text{formula (1)}$$

By performing calculation like the formula (1), an SAD value is acquired. In images having disparity which are captured by the imaging units arranged in parallel, the disparity is 0 at infinity, and a closer object has larger disparity. At this time, when the image 2 is from the right viewpoint with the image 1 as a reference, the feature point on the image 2 moves to a left side. Thus, the pixel of interest is changed from a pixel a'$_0$ in a left direction with a search direction as the left side, the SAD value described above is acquired successively, and the pixel of interest having a minimum value among the acquired SAD values is set as the corresponding point. In this case, when the pixel a'$_1$ on the image 2, which is the corresponding point, has a result of the minimum value, this pixel is set as the corresponding point.

By performing such processing for pixels that the corresponding point is desired to be acquired, it is possible to acquire the disparity value for the pixels. In the present embodiment, a size of the image 1 and the image 2 is set as 1920×1080, a window size is set as 25×25 with the pixel of interest as a center, and calculation of the disparity value is performed. Note that, the aforementioned image and block sizes are set here, but are not limited thereto and may be set as appropriate in consideration of accuracy or a processing amount. Moreover, the disparity value is acquired by the block matching using the SAD in the present embodiment, but other evaluation function may be used. Moreover, without limitation to a region-based matching method like the block matching, other method for detecting a feature point may be used.

In such a method, a point or a region on an image, in which a gray value changes greatly, is extracted, processing for defining a feature amount is performed for the point or the region, and similarity is identified. An example of a method for extracting a feature point and identifying similarity thereof includes a feature amount detecting method using SHIFT (Scale-Invariant Feature Transform). In SHIFT, the surroundings of a feature point are divided into blocks of several pixels, and gradient histograms in eight directions are acquired for each block, which is illustrated with 128-dimensional feature vector. Further, other feature amount detection includes methods such as by SURF (Speeded-Up Robust Features) or GLOH (Gradient Location-Orientation Histogram) without constraint thereon.

Here, as described above, corresponding points are detected from right and left images when the disparity value is calculated, but when measurement target parts are featureless parts or surrounding regions have similar features, the corresponding points are difficult to be detected. For example, in the case of a region which is almost solid without a pattern or the like, there is a little feature, and therefore when the corresponding point at certain designated coordinates is detected, it is hard to discriminate the point from an adjacent region, so that the corresponding point might not be detected or may be erroneously detected. Moreover, even in the case of having a feature, the corresponding point is difficult to be detected in the same manner also when a region with high similarity exists in the vicinity of the corresponding point, for example, such as in the case of the point existing on a repetitive pattern. When the corresponding point is not detected accurately, the disparity value is not able to be calculated and measurement of a part desired by a user is not able to be performed.

Thus, whether detection of a corresponding point of a measurement part which is designated is possible, that is, whether the disparity value is being able to be calculated accurately is judged (S214). The judgment of possibility/impossibility for the calculation of the disparity value is performed, for example, by comparing differences from the SAD values of surrounding pixels when calculating the minimum value of the SAD value in the case of the block matching using the SAD. In the case of the block matching using the SAD, as described above, the SAD values are acquired in sequence and the pixel of interest having the minimum value among them is set as the corresponding point, but it is hard to discriminate the pixel of interest having the minimum value from the SAD values of the surrounding pixels in a region having a little feature or a region of a repetitive pattern.

That is, when clear judgment is possible, a peak of the minimum value occurs distinctly as compared with the surrounding pixels, while when the surrounding region has high similarity or is featureless, the SAD values of the surrounding pixels and the SAD value of the corresponding point become close values, so that a difference therebetween decreases. Therefore, by providing a certain threshold $\rho$, when the difference from the SAD values of the surrounding pixels is the threshold $\rho$ or less, it is regarded as having a little feature and it is judged that the disparity is not able to be calculated, and in the case of being the threshold $\rho$ or more, it is judged that the disparity value was able to be calculated accurately.

When it is judged that the disparity values corresponding to measurement points A and B were able to be calculated (FIG. 2B: YES at step S214), three-dimensional position coordinates with the imaging unit 101 as a reference is calculated by the three-dimensional position information calculation unit 113 (S215). At this time, in a strict sense, since a center of the reference image is set as an origin, an optical center of the first imaging unit 101a serves as an origin of the acquired three-dimensional coordinates. The three-dimensional coordinates acquired by the three-dimensional position information calculation unit 113 are output to the size information calculation unit 114, and a length between the measurement points A and B is calculated (S222), and calculated size information is output to the display unit 104 (S223). Specific processing of the three-dimensional position information calculation unit 113 and the size information calculation unit 114 will be described below.

In the present embodiment, description will be given by setting that the wall surface 302 which is a plane in which the measurement points A and B exist is a featureless region and it is judged that the disparity value is not able to be calculated (NO) by the aforementioned calculation of the disparity value.

When it is judged that the disparity value of the designated point is not able to be calculated, a plane region in which the measurement points A and B exist is acquired by the plane region acquisition unit 116 (FIG. 2B: S216). Here, it is considered that the acquisition of the plane region is designated by the user X. For example, a caution such as "designate a plane region including a measurement part" is displayed on the display unit 104, and the user X performs the designation by moving his/her finger so as to surround a target region on the touch panel liquid crystal accordingly. The designation of the plane region is not constrained to the above, as long as a method capable of inputting a plane region which is on the same face with a measurement region easily, for example, such as by designating two points and setting a rectangular region with the two points as opposing corners as a plane region, in addition to the above. Further, there is no constraint on a size or a shape of a region to be input, and any region is possible as long as being in the plane in which the measurement points A and B are arranged.

Since many plane regions normally exist in a captured image, it is difficult to identify a plane region including the measurement region, but by allowing the user to perform designation by simple input, it is possible to acquire an appropriate plane region without fail. Here, a designated area 304 in FIG. 3(b) indicates a region designated by the user X. The plane region acquisition unit 116 outputs region information which is acquired to the three-dimensional plane calculation unit 117.

The three-dimensional plane calculation unit 117 performs detection of a feature point, such as edge detection, in the acquired plane region on an image and judges a region having a feature (S217). Then, information about the judged feature region is output to the disparity value calculation unit 112, whether calculation of the disparity value from the acquired feature region is possible is judged, and three or more points where the disparity value is calculated particularly with high accuracy are selected to be set as plane coordinates (S219). Next, a three-dimensional plane position is defined from the acquired plane coordinates on the three or more points (S220).

Here, the above will be described specifically. In the present embodiment, it is considered that detection of a feature point was performed in a region of 304 (inside broken line) in FIG. 3 and seven points of candidate points (candidate points 305 to 311) having a feature were able to be acquired. Then, whether calculation of the disparity value is possible is judged for each of the candidate points. As described above, the judgment is performed based on a difference between the SAD values of surrounding pixels and a pixel with a minimum value at the time of calculation of the disparity value. When the difference of the SAD values is the threshold p or more, it is regarded that the reliable disparity value is able to be calculated and a point with the threshold or less is judged as having low reliability of the disparity value and excluded from the candidate points.

Here, it was judged that calculation of the disparity values was able to be performed for all the candidate points 305 to 311. Then, three points of the candidate points which are required when calculating a three-dimensional plane are selected. In the selection, any three points may be selected as long as a combination includes three points which are not arranged on a same straight line among the aforementioned candidate points for which the calculation of the disparity value is judged to be possible, but in view of a positional relation between the measurement points A and B and each of the candidate points, it is preferable to select a combination of candidate points such that a line segment AB connecting A and B is included in a region formed by the three points of the candidate points as much as possible.

This is because errors are able to be reduced when the region formed by the three points is a sufficiently large region with respect to a size of the line segment AB. For example, when errors of the disparity values of the respective candidate points are at a similar degree, a three-dimensional plane passing the three points of the point 305, the point 306 and the point 307 and a three-dimensional plane passing the three points of the point 309, the point 310 and the point 311 respectively have inclinations fluctuated by an amount of the errors of the respective points. At this time, when a distance L1 from an end point of the region formed by the point 305, the point 306, and the point 307 to the measurement point B and a distance L2 from an end point of the region formed by the point 309, the point 310, and the point 311 to the measurement point B are compared, the L1 is larger and the measurement point B is positioned out of the region formed by the three points of the candidate points, so that by an amount according to a ratio thereof, the error on the measurement point B becomes great. Therefore, it is possible to reduce the error by selecting the combination of the candidate points including the line segment AB.

Moreover, processing of detecting candidate points by detection of feature points and calculating the disparity value therefor for judgment is performed in the present embodiment, but without limitation thereto, for example, the disparity calculation and the judgment may be performed over an entire plane region which is acquired and candidate points are selected therefrom. However, since the block matching has an increased processing amount when the number of target coordinates increases, it is desirable to perform the calculation of the disparity value after narrowing the candidate points by processing with relatively low-operation such as edge detection. The three-dimensional plane position is calculated from the three or more points among the candidate points which are acquired in this manner. In this case, the point 309, the point 310 and the point 311 are selected, disparity values which are acquired by the disparity value calculation unit 112 with respect to these three points are output to the three-dimensional position information calculation unit 113 to acquire three-dimensional coordinates. When three coordinates in a three-dimensional space are found, it is possible to define the three-dimensional plane position.

Here, description will be given regarding calculation of three-dimensional coordinates in the three-dimensional position information calculation unit 113. Based on the disparity value of each point which is input and information input from the camera parameter acquisition unit 115, the three-dimensional position information calculation unit 113 calculates actual three-dimensional position information of each point. Here, the information input by the camera parameter acquisition unit 115 indicates an external camera parameter or an internal camera parameter of the imaging unit 101. The camera parameter acquisition unit 115 acquires such a parameter from the imaging unit 101, holds it as database, etc.

Here, the external camera parameter of the imaging units is information indicating: by what arrangement of imaging units the two images are captured, and examples thereof include a baseline length which is a distance between the two imaging units 101a and 101b, and an angle of convergence which indicates a relative angle of an optical axis between the imaging units. Moreover, the internal camera parameter is information including focal distance information of the imaging units at image capturing and a pixel pitch of the imaging device. The camera parameter acquisition unit 115 outputs such parameter information to the three-dimensional position information calculation unit 113.

The three-dimensional position information calculation unit 113 calculates actual three-dimensional position information at each point which is input. A three-dimensional position here is, at each capturing position, a coordinate position in a real space with an optical center of the imaging unit which has captured a reference image at the time of calculation of the disparity value as a reference and represents a distance from the image capturing apparatus to an object or a position in right-left and up-down direction.

Figure 5:
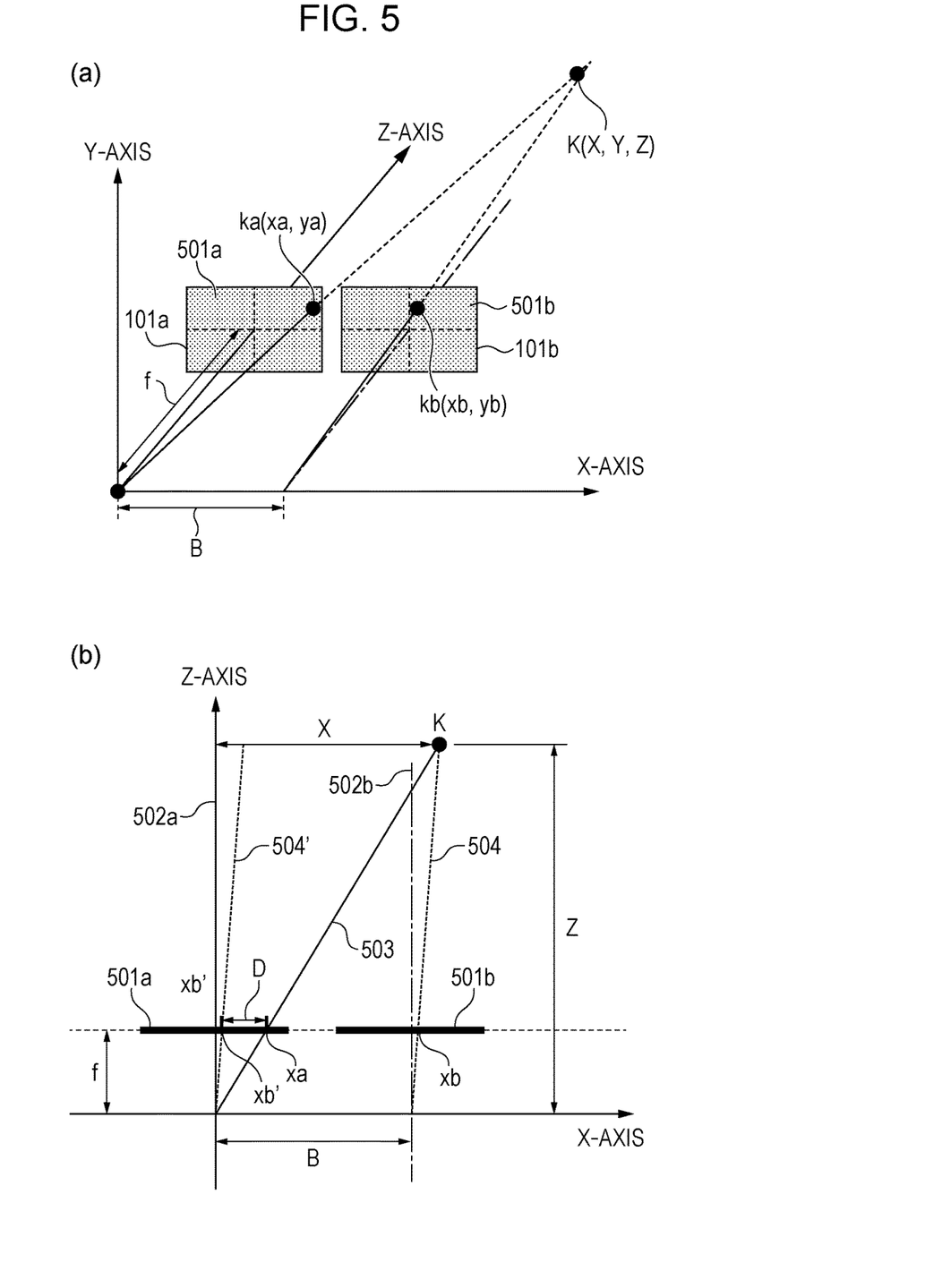
FIG. 5 is a view for explaining three-dimensional positions.

Description will be given for a three-dimensional position calculated by the three-dimensional position information calculation unit 113 by using FIGS. 5(a) and (b). FIG. 5(a) conceptually illustrates a relation between arrangement of a three-dimensional space formed by an X-axis, a Y-axis and a Z-axis in the figure and each imaging unit, in which the Z-axis corresponds to the optical axis of the imaging unit 101a serving as a reference. Further, it is considered that the imaging unit 101b is arranged at a position moved by a baseline length B in parallel to the imaging unit 101a. At this time, when a focal distance of the imaging unit is a focal distance f, sensor planes 501a and 501b of the two imaging units are arranged at a plane position of Z=f.

Here, when coordinates of a point K on an object which is positioned in a three-dimensional space are represented by (X, Y, Z), the point K is projected onto the two sensor planes 501a and 501b, and points on the sensor planes, which are projected, are represented by ka and kb, respectively. Coordinates of the point K projected on the sensor planes 501a and 501b are able to be indicated in units of pixels, and when an origin is set at upper-left on the reference image, for example, the coordinates of ka and kb are able to be expressed as (xa, ya) and (xb, yb), respectively. Further, FIG. 5(b) illustrates a view when FIG. 5(a) is seen from a Y-axis direction. An optical axis 502a of the imaging unit 101a in FIG. 5(b) is matched with the Z-axis and is in parallel to an optical axis 502b of the imaging unit 101b. The point K is projected at the coordinate xa on the sensor plane 501a at the intersection with a straight line 503 which connects an origin of the three-dimensional coordinate and the point K. In the same manner, the point K is projected at a position of the coordinate xb on the sensor plane 501b at the intersection with a straight line 504. Disparity D is a difference between projection positions of the same point K, and is therefore able to be shown as D=|xa−x|. Virtually, the position of xb may be said as a difference from an intersection xb' when the straight line 504 is positioned so as to pass the origin on the sensor plane 501a.

Here, the point K (X, Y, Z) is acquired.

Coordinates ka' when the coordinates ka on an image are expressed with a center of the image as an origin are set as (x', y'). At this time, by using the disparity value D with respect to the point K, the focal distance f at the time of image capturing, the baseline length B, and a pixel pitch P of the sensor, a distance Z to the point K in the real space is able to be expressed as follows:

$$Z=(B \times f)/(D \times P).$$

In addition, since a size per pixel of the sensor is able to be shown as Z*P/f on a plane of the distance Z, X and Y of the three-dimensional position information (X, Y, Z) with the center of the reference image as a reference is able to be expressed as follows:

$$X=x' \times B/D$$

$$Y=y' \times B/D$$

When the three-dimensional position information in the actual space is acquired at each point as described above, a positional relation between points is found for each image captured at each image capturing position. At this time, the three-dimensional position information calculated from a pair of images having disparity is arranged in a same space coordinate system.

The three-dimensional plane calculation unit 117 receives the three-dimensional coordinates of the three candidate points from the three-dimensional position coordinate calculation unit 113 and acquires the three-dimensional plane position in this manner. The acquired three-dimensional plane information is output to the measurement coordinate calculation unit 118, and the three-dimensional coordinates corresponding to the measurement points A and B are calculated. At this time, two-dimensional coordinates of the three points of the candidate points and the two points of the measurement points A and B on the images are known, and further, they are positioned on the same plane on the three-dimensional plane, so that the three-dimensional coordinates of the measurement points A and B are able to be acquired by projecting the measurement points A and B on the calculated three-dimensional plane to acquire coordinate positions on the three-dimensional plane. Here, the acquired three-dimensional coordinates of the measurement points A and B are set as A (Xa, Ya, Za) and B (Xb, Yb, Zb).

Next, the acquired three-dimensional coordinate values of the measurement points A and B are output to the size information calculation unit 114, and a length between the points A and B is calculated (S221). At this time, the length L is able to be calculated as follows from the three-dimensional position information of each of the two points A and B:

$$L=\sqrt{(|Xa-Xb'|^2+|Yb-Yb'|^2+|Za-Zb'|^2)}$$ [Expression 2]

Then, length information (D11) which is calculated is output to the display unit 104 to display the length information (S223), and the measurement mode is finished. In the output of the calculated length, when the point A and the point B and lengths corresponding thereto are displayed being superimposed on the captured image, it is easily recognizable whether the length is a length of a desired region.

In this manner, according to the image capturing apparatus of the present embodiment, even in the case of a region that the disparity value is difficult to be calculated, by designating a same plane as a measurement region with simple operation by a user, it is possible to acquire a length of a desired region.

Moreover, description has been given in the present embodiment for the measurement of a length between two points, but without limitation thereto, a distance to a certain point or an area of a region surrounded by three or more points is also able to be acquired with a similar configuration. This is because a three-dimensional plane on a same plane at measurement points is calculated, so that three-dimensional positions of not only one point but a plurality of measurement points are able to be acquired.

In the aforementioned embodiment, configurations and the like are not limited to those illustrated in the accompanying drawings, and may be adequately changed within the scope in which the advantageous effects of the present invention can be achieved. Additionally, they may be implemented with some appropriate alternations as long as not departing from the scope of the aim of the present invention.

Moreover, each component of the present invention can be desirably selected, and an invention provided with a selected configuration is also included in the present invention.

The present invention includes, when an image capturing apparatus is specified, various apparatuses such as a mobile terminal having an image capturing apparatus (a smartphone, a mobile telephone, a PC, etc.), a camera, an information processing device that acquires a length by using captured data from an image capturing device, and not limited by a name of equipment. Moreover, the present invention is also useable for video processing of a recorder or a television receiver.

Further, processing of each unit may be performed by recording a program for realizing functions described in the present embodiment in a computer readable recording medium and causing a computer system to read the program recorded in the recording medium for execution. Note that, the "computer system" which is referred to herein includes an OS and hardware such as peripheral equipment.

Moreover, the "computer system" includes a home page providing environment (or display environment) when using a WWW system.

Further, the "computer readable recording medium" refers to a portable medium such as a flexible disk, a magneto-optical disk, a ROM or a CD-ROM, or a storage device such as a hard disk installed in the computer system. Furthermore, the "computer readable recording medium" also includes one for holding a program dynamically for a short time period like a communication line when a program is transmitted via a network such as the Internet or a communication line such as a telephone line, and one for holding a program for a certain period of time like a volatile memory inside a computer system serving as a server or a client in such a case. In addition, the aforementioned program may be a program for realizing a part of the functions described above, and further may be a program capable of realizing the functions described above in combination with a program which has been already stored in the computer system. At least a part of the functions may be realized by hardware such as an integrated circuit.

(1) An image measurement device includes a disparity value calculation unit that calculates a disparity value from image data of images having disparity; a three-dimensional position coordinate calculation unit that acquires three-dimensional position information of the image data by using the disparity value; a measurement region detection unit that detects a measurement region in the images having the disparity; a plane region acquisition unit that acquires a region which is positioned at a same plane with the measurement region by being designated in the image; a three-dimensional plane calculation unit that converts the region acquired by the plane region acquisition unit into a plane in a three-dimensional space; a measurement coordinate conversion unit that converts the measurement region into a position on the plane in the three-dimensional space; and a size information calculation unit that calculates a length of the measurement region.

(2) The three-dimensional plane calculation unit performs detection of a feature point in the region of the plane in the three-dimensional space, outputs information of a feature region having a feature to the disparity value calculation unit, judges whether calculation of a disparity value is possible from the acquired feature region, selects three or more points in which a disparity value is calculated accurately to set as plane coordinates, and defines a three-dimensional plane position from the acquired plane coordinates of the three or more points.

(3) In the case of selecting the feature point, a combination in which three points of candidate points which are judged that calculation of the disparity value is possible are not arranged on a same straight line, which is a combination of the candidate points such that a line segment AB connecting measurement points A and B is included as much as possible in a region formed by the three points of the candidate points, is selected.

(4) This is because errors are able to be reduced when the region formed by the three points is a sufficiently large region with respect to a size of the line segment. For example, when errors of the disparity values of the respective candidate points are at a similar degree, a three-dimensional plane passing the three points and a three-dimensional plane passing different three points respectively have inclinations fluctuated by an amount of the errors of the respective points.

At this time, when a distance L1 from an end point of the region formed by the former three points to the measurement point B and a distance L2 from an end point of the region formed by the latter three points to the measurement point B are compared, the L1 is larger and the measurement point B is positioned out of the region formed by the three points of the candidate points, so that by an amount according to a ratio thereof, the error on the measurement point B becomes great. Therefore, it is possible to reduce the error by selecting the combination of the candidate points including the line segment AB.

The three-dimensional position information calculation unit calculates actual three-dimensional position information of each point based on the input disparity value of each point and camera parameter information input from a camera parameter acquisition unit.

(5) The three-dimensional plane calculation unit receives three-dimensional coordinates of the three candidate points from the three-dimensional position coordinate calculation unit, acquires a three-dimensional plane position, outputs the acquired three-dimensional plane information to the measurement coordinate calculation unit, and calculates three-dimensional coordinates corresponding to the two measurement points.

At this time, two-dimensional coordinates of the three points of the candidate points and the two points of the measurement points A and B on the images are known, and further, they are positioned on the same plane in the three-dimensional plane, so that the three-dimensional coordinates of the measurement points A and B are able to be acquired by projecting the measurement points A and B on the calculated three-dimensional plane to acquire coordinate positions on the three-dimensional plane.

(6) An image measurement method includes a disparity value calculation step of calculating a disparity value from image data of images having disparity; a three-dimensional position coordinate calculation step of acquiring three-dimensional position information of the image data by using the disparity value; a measurement region detection unit step of detecting a measurement region in the images having the disparity; a plane region acquisition step of acquiring a region which is positioned at a same plane with the measurement region by being designated in the image; a three-dimensional plane calculation step of converting the region acquired by the plane region acquisition unit into a plane in a three-dimensional space; and a measurement coordinate conversion step of converting the measurement region into a position on the plane in the three-dimensional space, in which a length of the measurement region is calculated.

(7) A program is for causing a computer to function as a disparity value calculation unit that calculates a disparity value from image data of images having disparity; a three-dimensional position coordinate calculation unit that acquires three-dimensional position information of the image data by using the disparity value; a measurement region detection unit that detects a measurement region in the images having the disparity; a plane region acquisition unit that acquires a region which is positioned at a same plane with the measurement region by being designated in the image; a three-dimensional plane calculation unit that converts the region acquired by the plane region acquisition unit into a plane in a three-dimensional space; a measurement coordinate conversion unit that converts the measurement region into a position on the plane in the three-dimensional space; and a size information calculation unit that calculates a length of the measurement region.

INDUSTRIAL APPLICABILITY

The present invention is usable for an image measurement device.

REFERENCE SIGNS LIST

100 image capturing apparatus
101 imaging unit
102 image processing unit
103 recording unit
104 display unit
105 input unit
106 measurement unit
111 measurement region detection unit
112 disparity value calculation unit
113 three-dimensional position information calculation unit
114 size information calculation unit

115 camera parameter acquisition unit
116 plane region acquisition unit
117 three-dimensional plane calculation unit
118 measurement coordinate calculation unit All publications, patents and patent applications cited in this description are incorporated in this description by reference in their entirety.

The invention claimed is:

1. An image measurement device, comprising:
a measurement region detector that detects a measurement region in images having disparity;
a plane region acquirer that acquires a designation of a plane region in the images which is positioned at a same plane as the measurement region in the images;
a measurement coordinate converter that acquires three-dimensional coordinates of the measurement region in the images by projecting the measurement region in the images onto a plane in a three-dimensional space which is converted from the plane region in the images by using a disparity value between the images having disparity; and
an information calculator that calculates a measured value of the measurement region in the images based on the coordinates.

2. The image measurement device according to claim 1, wherein the three-dimensional plane calculator performs detection of a feature point in a region of the plane in the three-dimensional space, judges whether calculation of a disparity value of the feature point is possible, selects three or more feature points in which the disparity value of the feature point is calculated accurately to set as plane coordinates, and defines a three-dimensional plane position from the plane coordinates of the three or more feature points.

3. The image measurement device according to claim 2, wherein in selecting the three of more feature points, a combination of three candidate points of the feature points in which calculation of the disparity value of the feature point is possible is selected such that the three candidate points are not arranged on a same straight line, and a line segment AB connecting measurement points A and B is included as much as possible in a region formed by the three candidate points.

4. A computer readable non-transitory recording medium having stored therein a program for causing a computer to function as
a measurement region detector that detects a measurement region in images having disparity;
a plane region acquirer that acquires a designation of a plane region in the images which is positioned at a same plane as the measurement region in the images;
a measurement coordinate converter that acquires three-dimensional coordinates of the measurement region in the images by projecting the measurement region in the images onto a plane in a three-dimensional space which is converted from the plane region in the images by using a disparity value between the images having disparity; and
an information calculator that calculates a measured value of the measurement region in the images based on the coordinates.

* * * * *